C. W. LARNER.
GOVERNOR OPERATED PRESSURE REGULATOR.
APPLICATION FILED JULY 24, 1917.
1,422,212.
Patented July 11, 1922.
2 SHEETS—SHEET 1.
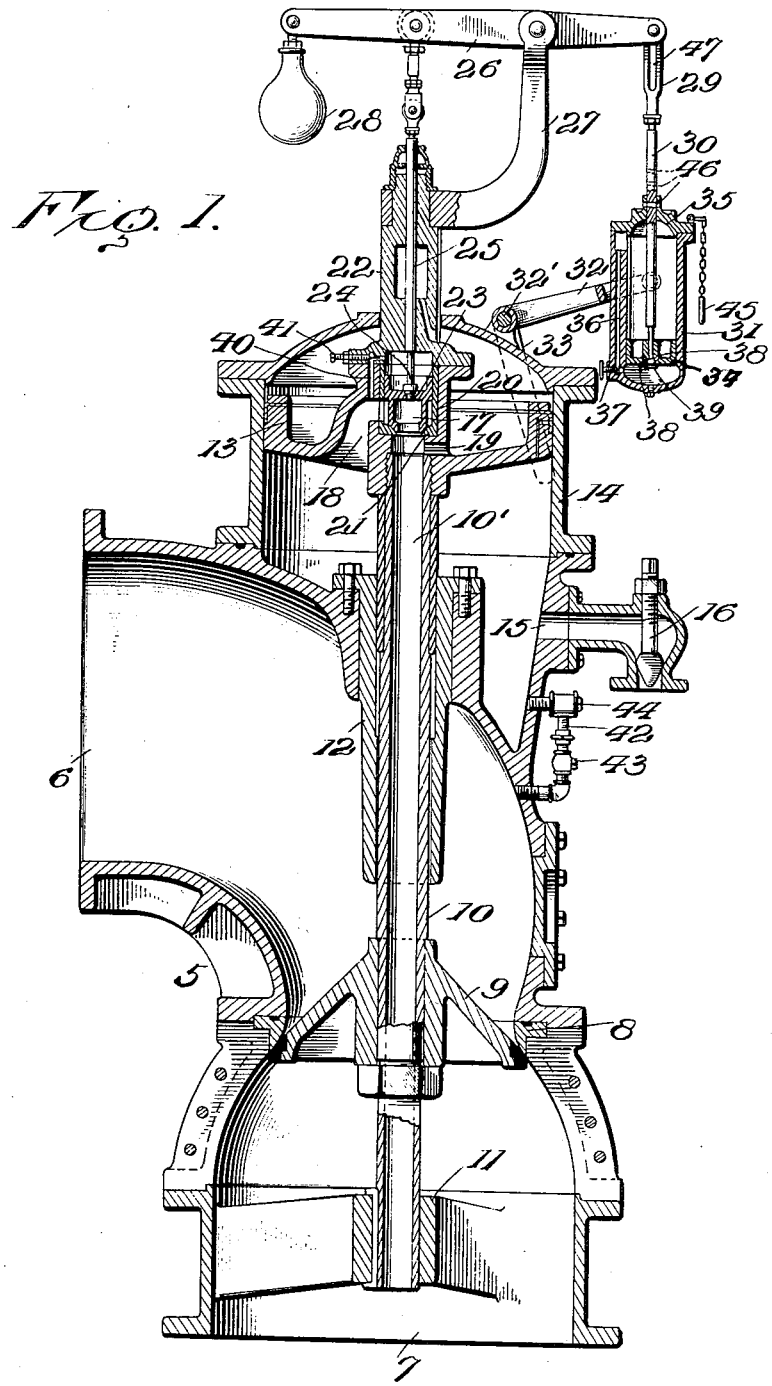
Inventor
Chester W. Larner.
A. B. Staughton
Attorney C. W. LARNER.
GOVERNOR OPERATED PRESSURE REGULATOR.
APPLICATION FILED JULY 24, 1917.
1,422,212.
Patented July 11, 1922.
2 SHEETS—SHEET 2.
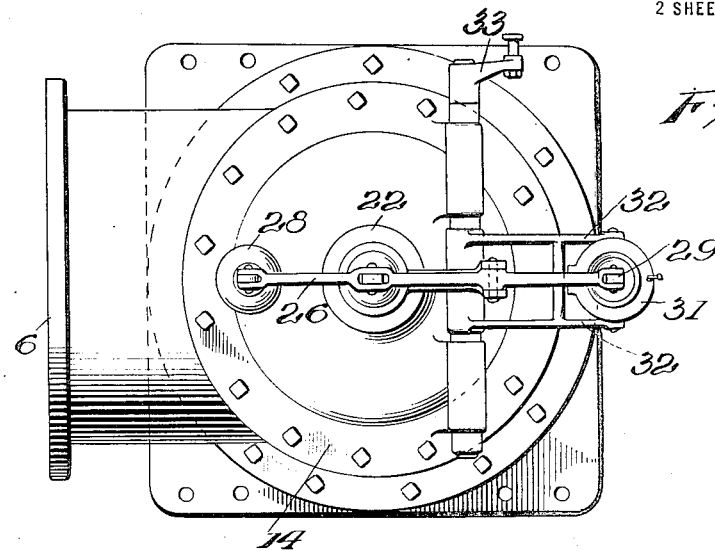
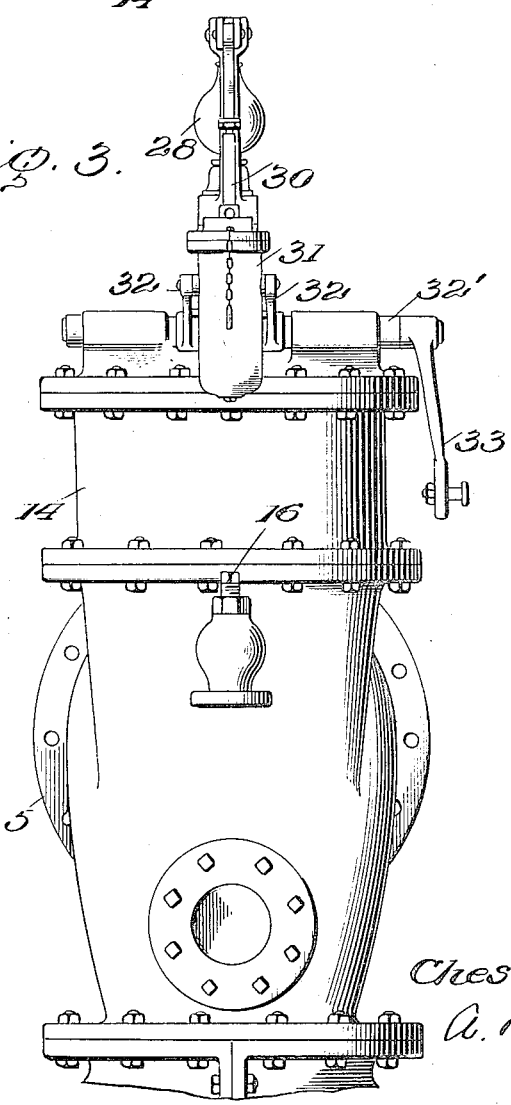
Inventor
Chester W. Larner.
A. B. Stoughton
Attorney

UNITED STATES PATENT OFFICE.

CHESTER W. LARNER, OF CLEVELAND, OHIO.

GOVERNOR-OPERATED PRESSURE REGULATOR.

1,422,212. Specification of Letters Patent. Patented July 11, 1922.

Application filed July 24, 1917. Serial No. 182,402.

*To all whom it may concern:*

Be it known that I, CHESTER W. LARNER, a citizen of the United States, residing at Cleveland, in the county of Cuyahoga and State of Ohio, have invented certain new and useful Improvements in Governor-Operated Pressure Regulators, of which the following is a specification.

In water wheel installations there are fluctuations in velocity and pressure in the penstock, feeder or wheel casing, resulting from the sudden closing or opening of the wheel gates in response to changes of load on the water wheel, which unduly strain the parts and are otherwise more or less destructive and in any event interfere with the speed regulation of the water wheel.

It is the object of the present invention to prevent or overcome such fluctuations, and generally stated to provide means, which in response to a sudden closing of the wheel gates will discharge an approximately equal or proportionate amount of water to that rejected by the wheel and which will thereupon close automatically and slowly so as not to cause any considerable rise of pressure in the conduit or wheel casing; said means being substantially inactive when conditions are normal, and being also capable of adjustment so as to waste water constantly or until an increased demand is made upon the feeder by a further opening of the wheel gates whereupon the regulating means will stop wasting, so that the additional demand of the wheel is satisfied without sudden acceleration of velocity and consequent drop of pressure in the feeder.

The invention is embodied in a synchronously operated regulating valve and piston, the effective area of the piston exceeding that of the valve so that when subjected to penstock pressure it has an inherent tendency to seat the valve. The rod carrying the valve and piston is a hollow member and constitutes a by-pass or waste channel, and the piston is ported for communication therewith so as to relieve the pressure in its operating cylinder in order to unseat the valve, communication being established and disestablished by a differential control or relay valve carried in the piston head and operating in conjunction with governing mechanism operatively connected with the gate or gate-actuating mechanism.

The invention is further embodied in a governor-operated pressure regulating system substantially as hereinafter described and claimed.

In the annexed drawings, Figure 1 is a view principally in central vertical section of a governor-operated regulating system embodying features of my invention. Fig. 2 is a top view; and Fig. 3 is an end view.

Referring to Fig. 1, the numeral 5 indicates a quarter turn shell or casing equipped with a valve which controls the discharge of water therethrough. Its intake 6 may connect as usual with the wheel casing, feeder or penstock. Its outlet 7 has a valve-seat 8 to accommodate the regulating valve 9, which is carried by a hollow stem or piston rod 10 the lower end of which is centered in a ring or spider 11.

The valve stem or rod 10 ranges upwardly through a bushing 12 penetrating the upper wall of the quarter turn and carries a piston 13 operatively mounted in a cylinder 14 formed with or secured to the quarter turn. The cylinder space below the piston is adapted for communication through a port 15 with the feeder or penstock, the port being controlled by a needle valve 16.

The transverse or effective area of the piston is greater than that of the valve 9, the result being that if penstock pressure is applied to the bottom of the piston it overbalances the penstock pressure on the valve and the latter is closed upon its seat in response to an upward movement of the piston. Evidently then, the valve 9 may be unseated only by reducing the pressure in the cylinder 14. This is accomplished by a differential control or relay valve 17 seated on the piston 13 and responding to movements of the gate-actuating mechanism in a manner hereinafter described. The piston 13 is provided with a passage 18 that connects the rod passage 10' with the space below the piston, and the function of the relay valve is to make or break such connection. When the relay valve is lifted from its seat it allows the fluid in the cylinder to discharge through the hollow piston rod. In order to reduce the cylinder pressure quickly with a small movement of the relay valve it is necessary of course to throttle the supply pipe from the penstock. This is effected by manipulating the needle valve 16. No pressure is applied to the top of the piston and any leakage that may occur through the packing escapes through drain holes 19 into the piston rod.

The relay valve 17 is accommodated in a valve-way or socket 20 formed in piston 13 and its movement independent of the piston is limited at one end by its seat 21 and at the other end by a pilot valve fitting 22 also carried by the piston. The relay valve has a port 23 which is controlled by a pilot valve 24, the stem 25 of which extends upwardly through the fitting 22 and is connected to a floating lever 26, the fulcrum 27 of which is carried by the fitting 22 and hence is shifted in response to movements of the piston 13.

For small regulators the relay valve is omitted and the discharge through the hollow piston rod is controlled directly by the pilot valve, the relay valve being utilized only to avoid the use of a large pilot valve.

One end of the floating lever 26 carries an adjustable or variable weight 28 and the other end carries a slotted arm 29 to which is attached the stem or piston rod 30 of an oil brake or dash pot 31. The latter is supported by a pair of levers 32 fixed to a shaft 32' journaled on top of the cylinder. The shaft 32' is provided at one end with an arm or lever 33, which is connected in any suitable way (not shown) with the gates or gate-actuating mechanism of the water wheel. The relation is such that when the turbine gates close, the double lever 32 moves downward and takes with it the dash pot.

The dash pot is completely filled with a fairly heavy oil when its piston 34 and stem 30 are at the bottom, the cover 35 being removable for this purpose. There is a by-pass 36 for the oil and the latter is by-passed due to the upward pull on the stem exerted by the weight 28. The ratio of leverage is two to one and therefore the pull on the stem of the dash pot is double the weight of element 28. A needle valve 37 is provided to control the flow of oil from the top to the bottom of the dash pot, and the valve is so set as to permit of a very slight leakage.

The dash pot piston 34 is provided with ports 38 which are controlled by a check valve 39 on the end of the stem 30. The check valve prevents by-passing of oil when the piston is pulled down by the dash pot. The ports 38 are automatically opened when piston 34 tends to move upward with the dash pot. This permits the oil to by-pass rapidly and obviates any danger of springing the pilot valve or the dash pot stem.

For an instantaneous downward movement of the dash pot, the by-pass 36 has practically no effect and consequently the piston 34 will move with the dash pot. The movement of the piston 34 is communicated through the floating lever 26 to the pilot valve 24. The result is that pilot valve 24 is raised from its seat in the top of the relay valve 17, thus opening the port 23 connecting the chamber above the relay valve with the passage 10' of the main piston rod, and relieving the pressure supplied through a by-pass 40 controlled by a needle valve 41. The relay valve 17 is a differential plunger having a certain amount of constant uplift due to the pressure in the annular space below it. As soon as the pressure above the relay valve is reduced by the opening of the pilot valve, the pressure below the relay valve suffices to raise it and allows the pressure below the piston 13 to discharge through the waste-way 10'. The piston, therefore, descends due to penstock pressure on the main valve 9.

Referring to Fig. 1, it will be observed that fulcrum 27 of the floating lever is connected to the piston 13 and moves with it. It follows that the relay valve 17 cannot be closed unless the floating lever is in a horizontal position. Evidently then, the main valve 9 will continue to open until the shifting of the fulcrum brings the floating lever to this position. The pilot valve will then have seated itself on the relay valve, which in turn will have seated itself on the piston, thus stopping the discharge of water from the cylinder and checking the opening of the main valve 9. In this manner the stroke of the main valve is exactly proportional to the initial movement of the dash pot, and the stroke of the latter is proportional to that of the turbine gates.

After the valve 9 has opened, it will close automatically at a rate which is controlled by the adjustment of the by-pass 36 of the dash pot. The closing action is inaugurated by the weight 28 acting through the floating lever on the pilot valve. The weight tends to force the pilot valve to its seat and as long as it is on its seat the regulator tends to close. If, however, the closing action of the regulator is faster than the rate of rise of the dash pot piston, the floating lever pulls the pilot valve off its seat and checks the closing action of the regulator. Inasmuch as piston 34 can move upward in the dash pot only as fast as the oil can by-pass from the top to the bottom, it is obvious that the rate of motion in the dash pot controls the rate of motion of the regulating or main valve 9.

A test fitting or by-pass 42, having a cock 43, connects the cylinder 14 with the quarter turn and is useful for draining the cylinder in the event of dismantling or for supplying pressure to the cylinder other than from the penstock, for example when installing and adjusting a new plant the pressure connection may be made at 44.

The regulator may be set to operate either "single-acting" or "double-acting." The valve is normally "single-acting" and will open in response to a closing movement of the turbine gates, and then close automatically as slowly as may be desired, in the manner already described. When set to operate "double-acting," the valve will open an amount proportionate to the closing of the turbine gates, and remain in that position until it is further affected by a subsequent change in the position of the gates. In this case the regulator acts as a synchronous by-pass and wastes water whenever the load on the turbine is below the maximum. It is closed only when the turbine gates are wide open, and it is wide open only when the turbine gates are closed to the point where only sufficient water is supplied to the wheel to run it at normal speed without load.

The regulator is set to operate "double-acting" by inserting a pin 45 through the neck of the dash pot cover and one of the holes 46 in the stem 30. This establishes a rigid connection between the dash pot and the floating lever and eliminates the self-closing feature of the valve. The operation of the valve in other respects is exactly the same as has been previously described, the only difference being that the valve opens and remains open instead of closing automatically, and can be closed again only by an opening movement of the turbine gates. The slot 47 in the top of the dash pot stem is useful to prevent springing the pilot valve by forcing it against its seat more rapidly than the opening movement of the regulator will allow for.

There are three holes 46 in the stem of the dash pot, corresponding to different maximum discharges of the regulator when set to operate "double-acting." It depends upon the conditions of plant operation, which hole should be used to establish the rigid connection. For example, if it is desired to have the pressure regulator closed only when the turbine is carrying full load, then the pin 45 should be inserted in the top hole. If, however, the regulator is to be used "double-acting" at periods of the day when the maximum load on the turbine is not likely to go beyond three-quarters or half gate, then one of the lower holes should be used or a new hole should be drilled. The proper position of the hole can be determined by loading the turbine up to the desired point with the regulator set "single-acting," and then drilling a hole through the dash pot stem with the regulator in its closed position. After the proper location of the holes in the dash pot stem has been fixed, the regulator can be converted from "single-acting" to "double-acting" at any time while the turbine is in operation, by lifting the weight 28 and depressing the dash pot stem until the pin 45 can be inserted in the proper hole. This is readily done by hand, and makes it possible to operate with the self-closing feature during periods of the day when sudden load changes are relatively small, thus saving water, and at the same time readily convert it to a synchronous by-pass during periods of the day when load changes are too great to permit of proper pressure regulation with a single-acting valve.

If the regulator is to be used double-acting, throttle valves 16 and 41 should be opened more than for the single-acting operation, in order to accelerate the closing movement of the valve. To secure the best results, the valve should close in about the same time that the wheel gates open.

Having described the nature and objects of the invention, I claim:—

1. A regulating system of the type recited, comprising a piston and its operating cylinder, a valved connection for supplying pressure to the cylinder to raise the piston, a main valve interposed in the feeder line and carried by the piston rod and arranged to be seated in response to an upward movement of the piston, a waste-way extending through the piston rod to a point beyond the valve, and a governor-operated differential mounted in the piston head for establishing and dis-establishing communication between the space below the piston and said waste-way.

2. A regulating system of the type recited, comprising the combination of a penstock, a pressure regulating valve and its operating piston whereof both are mounted on a common valve stem which constitutes a by-pass for relieving the pressure under the piston and opening the regulating valve, means for supplying penstock pressure to raise the piston, a plunger valve carried by the piston for establishing and dis-establishing communication with said by-pass and the chamber under the piston, gate mechanism and governing mechanism intermediate said plunger valve and the gate mechanism.

3. A regulating system of the type recited, comprising a pressure regulating valve and its operating piston mounted for synchronous movement, a hollow spindle carrying said elements and communicating with the waste way of the valve, said spindle having a port arranged for communication with its hollow portion and with the space beneath the piston for closing the valve, a plunger valve carried by the piston for said port, a complemental pilot valve for controlling said plunger valve, gate mechanism, and governing mechanism intermediate the pilot valve and the gate mechanism.

4. A regulating system of the type recited, comprising a pressure regulating valve and its operating piston mounted for synchronous movement, a plunger valve carried by the piston for relieving the pressure thereon, a complemental pilot valve, a floating lever attached to the pilot valve and whereof its fulcrum is carried by the piston gate-actuating mechanism, a dash pot connecting one end of the lever with the gate actuating mechanism, and an adjustable weight at the opposite end of the lever.

5. Means for preventing or overcoming fluctuations in penstock velocity, comprising the combination with a penstock connection, of a main self-opening valve at the outlet end thereof, a single acting piston and cylinder for operating said valve in one direction by pressure communicated to only one side of the piston from the penstock, said piston having a waste port for relieving the pressure on the piston, gate mechanism, and a differential valve responsive to said connection for controlling said port.

6. A pressure regulating system of the type recited, comprising the combination with a penstock connection of a main valve and its casing, a piston and its cylinder, said cylinder and casing being subject to penstock pressure, and the piston and valve being mounted on a common sleeve or rod for synchronous movement, said sleeve or rod having a passage through it to the waste way of the main valve, the pressure being applied to only one side of the piston and overbalancing that on the valve so that the latter is normally held to its seat, gate operating mechanism, and a governor controlled differential valve connected with the gate operating mechanism for relieving pressure under the piston through the piston rod or stem passage.

7. A pressure regulating system of the type recited, comprising the combination of a penstock, a piston and its operating cylinder, means for supplying penstock pressure to one end only of the cylinder to raise the piston, a main valve in the feeder line carried by the piston rod and arranged to be seated in response to an upward movement of the piston, a waste way extending through the piston rod and discharging into the outlet of the main valve, and governor-operated means associated therewith for relieving pressure under the piston.

8. A pressure regulating system of the type recited, comprising the combination of a penstock, a single acting piston and its operating cylinder, a valved connection for supplying penstock pressure to the space below the piston, a main valve carried by the piston rod and arranged to be seated in response to penstock pressure on the piston, and a governor-operated differential waste valve in the piston head for relieving the pressure in the cylinder and opening the main valve.

In testimony whereof I affix my signature in the presence of two witnesses.

CHESTER W. LARNER.

Witnesses:
 JOHN B. SHAUB,
 C. D. GILPIN.